United States Patent
Rother et al.

(10) Patent No.: US 8,411,948 B2
(45) Date of Patent: Apr. 2, 2013

(54) UP-SAMPLING BINARY IMAGES FOR SEGMENTATION

(75) Inventors: Carsten Curt Eckard Rother, Cambridge (GB); Toby Sharp, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 12/718,232

(22) Filed: Mar. 5, 2010

(65) Prior Publication Data

US 2011/0216975 A1 Sep. 8, 2011

(51) Int. Cl.
*G06K 9/34* (2006.01)
*G06K 9/32* (2006.01)

(52) U.S. Cl. ........................ 382/173; 382/299

(58) Field of Classification Search ................. 382/132, 382/168, 173, 190, 192, 197, 199, 203, 209, 382/242, 128, 133, 134, 171, 172, 224; 348/273, 348/247, 449, 419, 51, 589
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |

(Continued)

FOREIGN PATENT DOCUMENTS

CN 201254344 6/2010
EP 0583061 2/1994

(Continued)

OTHER PUBLICATIONS

"3.18. Stroke Path". retrieved on Dec. 4, 2009 at <<http://docs.gimp.org/en/gimp-path-stroke.html>>, 2009, pp. 1-3.

(Continued)

*Primary Examiner* — Andrae S Allison
(74) *Attorney, Agent, or Firm* — Zete Law, P.L.L.C.; MacLane C. Key (57) ABSTRACT

A method of up-sampling binary images for segmentation is described. In an embodiment, digital images are down-sampled before segmentation. The resulting initial binary segmentation, which has a lower resolution than the original image, is then up-sampled and smoothed to generate an interim non-binary solution which has a higher resolution than the initial binary segmentation. The final binary segmentation for the image is then computed from the interim non-binary solution based on a threshold. This method does not use the original image data in inferring the final binary segmentation solution from the initial binary segmentation. In an embodiment, the method may be applied to all images and in another embodiment, the method may be used for images which comprise a large number of pixels in total or in single dimension and smaller images may not be down-sampled before segmentation.

20 Claims, 9 Drawing Sheets

U.S. PATENT DOCUMENTS

| | | | |
|---|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,900,953 A * | 5/1999 | Bottou et al. ............... 358/540 |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,151,025 A * | 11/2000 | Yen et al. ............... 345/418 |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,337,925 B1 | 1/2002 | Cohen et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,987,535 B1 * | 1/2006 | Matsugu et al. ............... 348/239 |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,992 B2 | 7/2006 | Greiffenhagen et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,430,339 B2 | 9/2008 | Rother et al. |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,589,721 B2 | 9/2009 | Lorenz |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,606,417 B2 | 10/2009 | Steinberg et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

| | | | |
|---|---|---|---|
| 7,760,182 | B2 | 7/2010 | Ahmad et al. |
| 7,778,439 | B2 | 8/2010 | Kondo et al. |
| 7,809,167 | B2 | 10/2010 | Bell |
| 7,834,846 | B1 | 11/2010 | Bell |
| 7,852,262 | B2 | 12/2010 | Namineni et al. |
| 7,860,311 | B2 | 12/2010 | Chen et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,155,405 | B2 | 4/2012 | Unal et al. |
| 8,165,369 | B2 * | 4/2012 | Kubota et al. ................. 382/128 |
| 8,170,350 | B2 * | 5/2012 | Steinberg et al. ............. 382/224 |
| 2003/0184815 | A1 | 10/2003 | Shiki et al. |
| 2004/0202369 | A1 | 10/2004 | Paragios |
| 2005/0271273 | A1 | 12/2005 | Blake et al. |
| 2007/0081710 | A1 | 4/2007 | Hong et al. |
| 2007/0122039 | A1 * | 5/2007 | Zhang et al. .................. 382/199 |
| 2007/0211940 | A1 * | 9/2007 | Fluck et al. ................... 382/173 |
| 2007/0237393 | A1 * | 10/2007 | Zhang et al. .................. 382/173 |
| 2008/0026838 | A1 | 1/2008 | Dunstan et al. |
| 2008/0152231 | A1 | 6/2008 | Gokturk et al. |
| 2008/0260247 | A1 | 10/2008 | Grady et al. |
| 2008/0304698 | A1 | 12/2008 | Rasmussen et al. |
| 2009/0033683 | A1 | 2/2009 | Schiff et al. |
| 2009/0060333 | A1 | 3/2009 | Singaraju et al. |
| 2009/0060334 | A1 | 3/2009 | Rayner |
| 2009/0315978 | A1 | 12/2009 | Wurmlin et al. |
| 2010/0104163 | A1 * | 4/2010 | Li et al. ......................... 382/132 |
| 2011/0075926 | A1 * | 3/2011 | Piramuthu et al. ............ 382/173 |
| 2011/0254950 | A1 | 10/2011 | Bibby et al. |

FOREIGN PATENT DOCUMENTS

| | | |
|---|---|---|
| JP | 08044490 | 2/1996 |
| WO | WO9310708 | 6/1993 |
| WO | WO9717598 | 5/1997 |
| WO | WO9944698 | 9/1999 |
| WO | WO2009093146 A1 | 7/2009 |
| WO | WO2009101577 A2 | 8/2009 |

OTHER PUBLICATIONS

Garain, et al., "On Foreground-Background Separation in Low Quality Color Document Images", retrieved on Dec. 3, 2009 at <<http://l3iexp.univ-Ir.fr/madonne/publications/garain2005a.pdf>>, IEEE Computer Society, Proceedings of International Conference on Document Analysis and Recognition (ICDAR), 2005, pp. 585-589.

Hertzmann, "Stroke-Based Rendering", retrieved on Dec. 3, 2009 at <<http://www.dgp.toronto.edu/~hertzman/sbr02/hertzmann-sbr02.pdf, Recent Advances in NPR for Art and Visualization, SIGGRAPH, vol. 3, 2002, pp. 1-31.

Kang, et al., "A Unified Scheme for Adaptive Stroke-Based Rendering", retrieved on Dec. 3, 2009 at http://www.cs.umsl.edu/~kang/Papers/kang_tvc06.pdf, Springer Berlin, The Visual Computer, vol. 22, No. 9-11, Sep. 2006, pp. 814-824.

Kolmogorov, et al., "Applications of parametric maxflow in computer vision", IEEE International Conference on Computer Vision (ICCV), Rio de Janeiro, BR, Oct. 2007, pp. 1-8.

Lempitsky, et al., "Image Segmentation with a Bounding Box Prior", IEEE International Conference on Computer Vision (ICCV), Kyoto, JP, 2009, pp. 1-8.

Liu, et al., "Paint Selection", retrieved on Dec. 3, 2009 at <<http://yuwing.kaist.ac.kr/courses/CS770/reading/PaintSelection.pdf>>, ACM, Transactions on Graphics (TOG), vol. 28, No. 3, Article 69, Aug. 2009, pp. 1-7.

Lu, et al., "Dynamic Foreground/Background Extraction from Images and Videos using Random Patches", retrieved on Dec. 3, 2009 at <<http://books.nips.cc/papers/files/nips19/NIPS2006_0103.pdf>>, Conference on Neural Information Processing Systems (NIPS), 2006, pp. 351-358.

Mannan, "Interactive Image Segmentation", retrieved on Dec. 2, 2009 at <<http://www.cs.mcgill.ca/~fmanna/ecse626/InteractiveImageSegmentation_Report.pdf>>, McGill University, Montreal, CA, Course ECSE-626: Statistical Computer Vision, 2009, pp. 1-5.

Mortensen, et al., "Intelligent Selection Tools", retrieved on Dec. 4, 2009 at <<http://web.engr.oregonstate.edu/~enm/publications/CVPR_00/demo.html>>, IEEE Proceedings of Conference on Computer Vision and Pattern Recognition (CVPR), Hilton Head Island, SC, vol. 2, 2000, pp. 776-777.

Protiere, et al., "Interactive Image Segmentation via Adaptive Weighted Distances", retrieved on Dec. 2, 2009 at <<http://citeseerx.ist.psu.edu/viewdoc/download?doi=10.1.1.97.776&rep=rep1&type=pdf>>, IEEE Proceedings of Conference on Computer Vision and Pattern Recognition (CVPR), New York, NY, Aug. 2006, pp. 160-167.

Tan, et al., "Selecting Objects With Freehand Sketches", retrieved on Dec. 3, 2009 at <<http://citeseerx.ist.psu.edu/viewdoc/download-?doi=10.1.1.83.4105&rep=rep1&type=pdf>>, IEEE Proceedings of International Conference on Computer Vision (ICCV), Vancouver, CA, vol. 1, Jul. 2001, pp. 337-345.

Vicente, et al., "Joint optimization of segmentation and appearance models", IEEE International Conference on Computer Vision (ICCV), Kyoto, JP, Oct. 2009, pp. 1-8.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Interactive Simulation and Training", 1994, Division Incorporated, 6 pages.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Office action for U.S. Appl. No. 12/718,321, mailed on Aug. 31, 2012, Rother et al., "Image Segmentation Using Reduced Foreground Training Data", 8 pages.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

\* cited by examiner

UP-SAMPLING BINARY IMAGES FOR SEGMENTATION

BACKGROUND

A number of techniques have been proposed to enable extraction of the foreground from a scene, for example, the extraction of a person from a digital image showing the person standing in front of a scenic view. This process of splitting an image into the foreground and background is known as image segmentation. Image segmentation comprises labeling Image elements (such as pixels, groups of pixels, voxels or groups of voxels) as either a foreground or a background image element. This is useful in digital photography, medical image analysis, and other application domains where it is helpful to find a boundary between an object in the image and a background. The object and the background may then be processed separately, differently, etc. In the case of a medical image it may be appropriate to segment out a region of an image depicting a tumor or organ such as the lungs in order to enable a surgeon to interpret the image data.

As digital camera and other image acquisition technology develops, however, the resolution of the digital images being captured is increasing rapidly and as a result the size of image files is also increasing rapidly. Images of 10-20 MPixels are now not uncommon and many mobile phones contain cameras capable of capturing images of five MPixels or more. Medical imaging systems can acquire 3D volumes with billions of voxels. In addition to requiring larger storage units (both in the digital camera and for off-camera storage), these larger image file sizes require significantly more processing to achieve image segmentation. If known image segmentation techniques are applied to such high-resolution images, the process can be very slow and a user may experience unacceptable delays.

The embodiments described below are not limited to implementations which solve any or all of the disadvantages of known image segmentation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of up-sampling binary images for segmentation is described. In an embodiment, digital images are down-sampled before segmentation. The resulting initial binary segmentation, which has a lower resolution than the original image, is then up-sampled and smoothed to generate an interim non-binary solution which has a higher resolution than the initial binary segmentation. The final binary segmentation solution for the image is then computed from the interim non-binary solution based on a threshold. This method does not use the original image data in inferring the final binary segmentation solution from the initial binary segmentation. In an embodiment, the method may be applied to all images and in another embodiment, the method may be used for images which comprise a large number of pixels in total or in single dimension and smaller images may not be down-sampled before segmentation.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image labeling system for foreground/background image segmentation, the system described is provided as an example and not a limitation. As those skilled in the art will appreciate, the present examples are suitable for application in a variety of different types of image labeling systems and a non-exhaustive list of examples is: 3D reconstruction, stereo matching, object segmentation, object recognition and optical flow.

Figure 1:
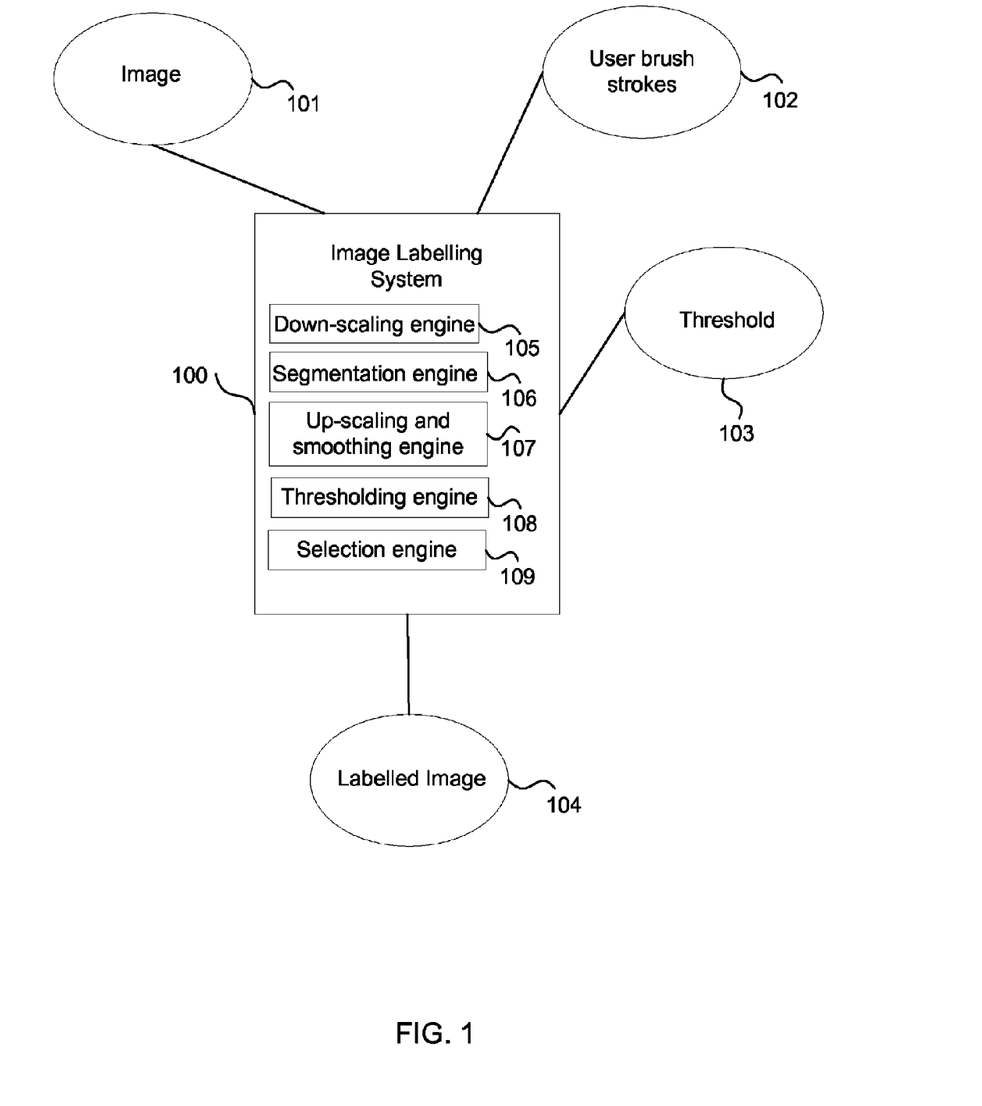
FIG. 1 is a schematic diagram of an image labeling system.

FIG. 1 is a schematic diagram of an image labeling system 100 implemented using a computer or processor of any suitable type. It is arranged to receive an image 101 as input and to provide as output a labeled version of that image 104 comprising, for each of a plurality of image elements, one of a specified plurality of possible labels. An image element may be a pixel, a group of pixels, a voxel or a group of voxels and the plurality of image elements may comprise all the image elements in the image or the image elements in one or more portions of the image. The term "image" is used herein in a broad sense to include digital still images such as photographs, video stills, or other digital 2D images, medical images such as CT scans, MRI scans or other digital medical images, digital 3D images or higher dimensional images such as obtained from Z-cameras, voxel volumes, satellite imaging systems, ultra-sound scans, as well as sequences of images such as videos, or other captured or generated sequences of images. The image labeling system optionally receives user input 102 specifying "seeds" for the labeling in the case that the image labeling uses an interactive segmentation algorithm. The image labeling system also optionally receives a user specified threshold 103, although in some embodiments, this may not be user specified and may be set to a fixed value or automatically configured by the image labeling system itself.

The image labeling system 100 may comprise a down-scaling engine 105 arranged to reduce the resolution of the input image 101 as described in more detail below. The image labeling system 100 may also comprise an image segmentation engine 106, an up-scaling and smoothing engine 107 and a thresholding engine 108 and the operation of these engines is described in more detail below. In some embodiments, the image labeling system 100 may further comprise a selection engine 109 and operation of this engine is described below with reference to FIG. 7.

Figure 2:
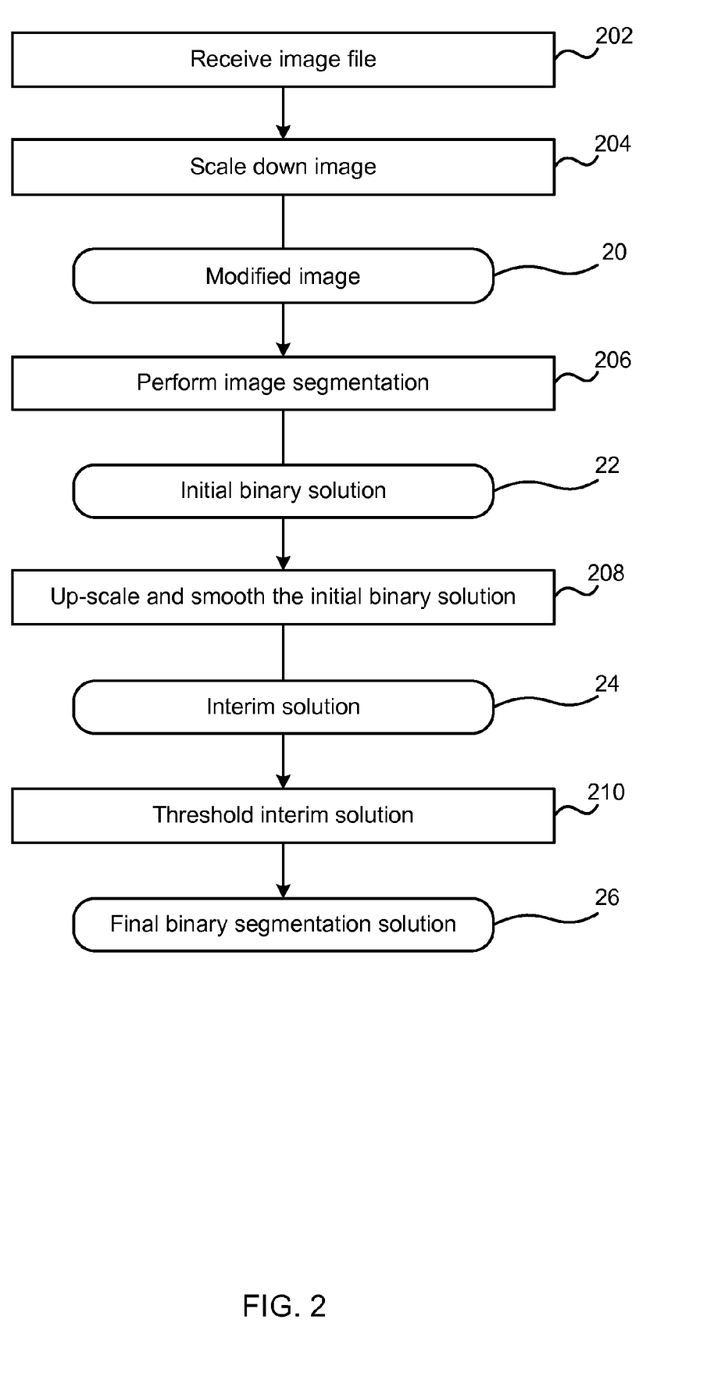
FIG. 2 is a flow diagram of an example method of performing image segmentation.

FIG. 2 is a flow diagram of an example method of performing image segmentation on an image, which may be an image comprising a large number of pixels, e.g. a 10 MPixel image. This method (and the other methods described herein) is described with reference to segmenting a foreground region from a background region in a digital image. However, it may be applied to other types of image labeling problem. It will also be appreciated that as camera technology advances, the numbers of pixels in an image may increase and any numbers of pixels given below are by way of example only.

The image is received (block 202) and is scaled down (block 204) to create a modified image 20 that is a version of the input image but has a lower resolution than the input image. Image segmentation is performed (in block 206) on the modified image 20 which creates an initial binary solution 22 (which may also be referred to as a binary mask). This initial binary solution 22 (or initial binary segmentation) labels image elements (e.g. pixels) in the modified image as being either foreground or background (as described above the labels may be applied to all the image elements in the image or to image elements in a portion of the image). In an embodiment of an initial binary solution, a parameter α, which is associated with an image element and may be referred to as an opacity value or binary segmentation parameter, has a value of zero or one. The initial binary solution 22 is then up-scaled and smoothed (block 208) to create an interim solution 24 which has a higher resolution than the initial binary solution 22 and the modified image 20. This interim solution 24 is a smooth, non-binary interpolated mask and may for example be a monochromatic interim solution, such as a gray-scale or red-scale solution, or a full color solution. In an embodiment of the interim solution, the parameter α, which may be referred to as a non-binary segmentation parameter, has a value between zero and one. In many embodiments, the interim solution 24 has the same resolution as the input image 20 but other resolutions may be appropriate in some applications.

In order to obtain a final binary segmentation solution 26 (which may also be referred to as a binary high resolution mask), a threshold is applied to the interim solution 24 (in block 210). The final binary segmentation solution 26 has substantially the same resolution as the interim solution and has a higher resolution than the initial binary solution 22 and the modified image 20. The final binary segmentation solution provides a label for image elements (e.g. pixels) in the image (e.g. in all or a part of the image) as being either foreground or background (e.g. α=0 or 1) and this solution can then be used by image editing tools to extract a portion of the image or for another purpose (e.g. modification or correction of a portion of image). The solution may also be used for image re-composition, e.g. extraction of a foreground from one image (such as a person) and composition of the extracted foreground onto a new background (such as a street). In some embodiments, further processing may be applied to the final binary segmentation solution 26. The results of the segmentation may be displayed to a user via a display (not shown in FIG. 2). e.g. the foreground or the background portions may be displayed or the two portions may be displayed as different layers within an image editing application or tool. The individual steps of the method shown in FIG. 2 are described in more detail below.

Although other methods may perform a part of the image segmentation process on a scaled down version of the input image, these other methods still use the original resolution input image data in order to infer the segmentation solution at the original resolution (i.e. the resolution of the image received in block 202). The method shown in FIG. 2 does not use the original resolution input image data (as received in block 202) or the modified image 20 (which is a version of the input image having lower resolution) in creating the binary segmentation in the original resolution image (i.e. in creating the final binary segmentation solution 26) and therefore may be considered 'data independent'. The method of FIG. 2 reduces the processing required to perform image segmentation and hence reduces the runtime. This in turn improves the user experience as they do not experience large delays when extracting foreground from a digital image.

Where further processing is applied to the final binary segmentation solution 26 (i.e. after block 210), this may, in some examples, use the original resolution input image data (e.g. as received in block 202).

The input image, received in block 202, may be directly acquired (e.g. by a digital camera) or may be a digitized image (e.g. as created using a scanner) and although the method is described as being applied to images comprising a large number of image elements (e.g. pixels), the method may also be applied to images which comprise smaller numbers of image elements (e.g. 2 MPixel images). In an embodiment, the method may be applied to all images (i.e. to any input image received irrespective of the number of image elements in the image) or in another embodiment it may be applied to images where it is more efficient to use the method of FIG. 2 than to perform the image segmentation on the original resolution image (e.g. see the embodiment described below with reference to FIG. 7).

The down-scaling of the input image (in box 204, e.g. as performed by the down-scaling engine 105 in FIG. 1) may be performed using any suitable method and considering any appropriate factors for the application. In an embodiment, a box filter may be used (e.g. a box filter with fixed point arithmetic and threads parallelized over image regions) and in an example of such an embodiment, the down-scaling may be performed by looping over source image elements (i.e. image elements in the original image) and averaging them over each destination image element region (i.e. image elements in the modified image). In an embodiment, the input image may be down-scaled so that the modified image 20 is of a particular overall size in terms of the number of image elements (e.g. 1.5 MPixels) and in another embodiment, the input image may be down-scaled so that the modified image 20 has a predefined value of its longest dimension (e.g. 1024 pixels). In other embodiments, different criteria may alternatively be used.

Figure 3:
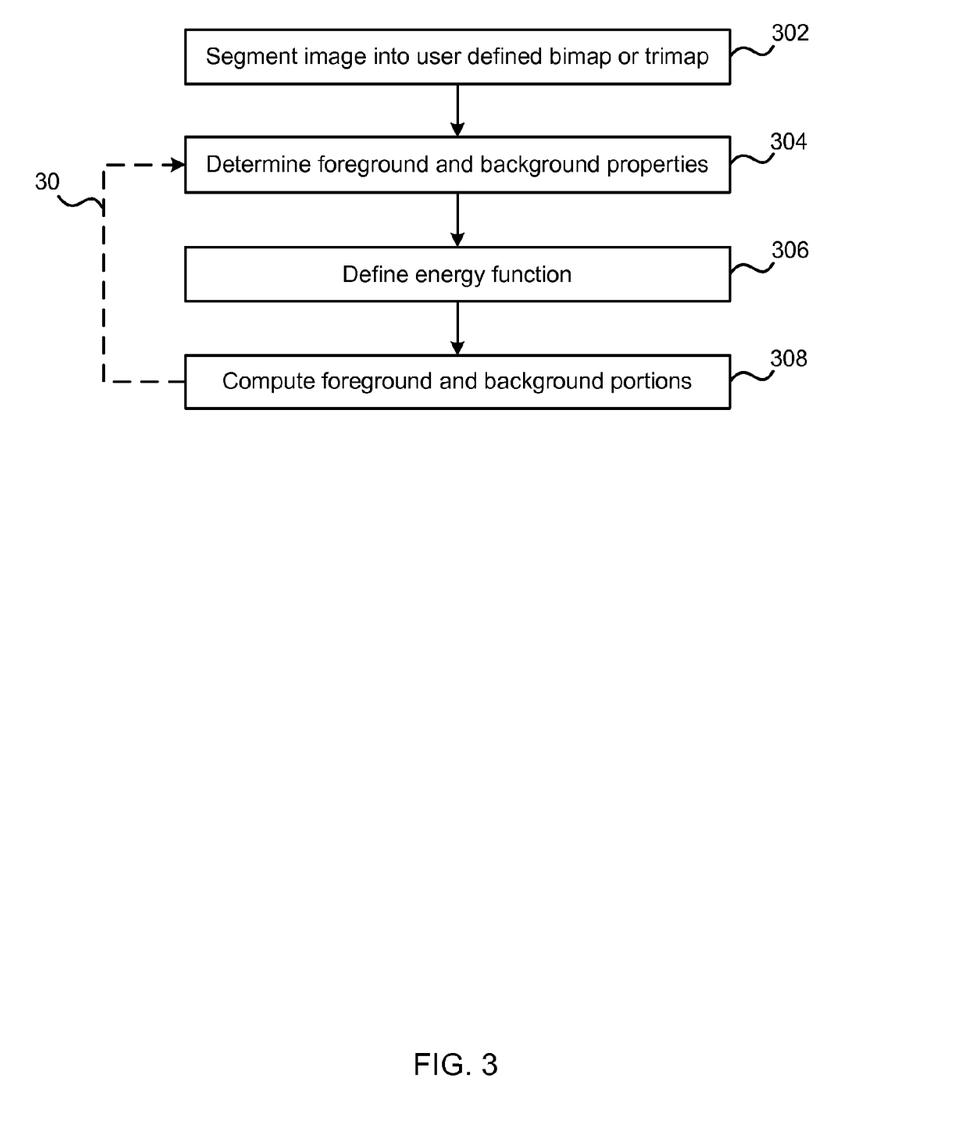
FIG. 3 is a flow diagram of an example method of image segmentation.

The image segmentation of the modified image 20 (in block 206, e.g. as performed by the image segmentation engine 106 in FIG. 1) may be performed using any suitable segmentation method. An example of a suitable method (referred to herein as 'GrabCut') is described in U.S. patent application Ser. No. 10/861,771 (Publication No. 2005/

0271273) which is incorporated herein by reference in its entirety. A brief overview of an embodiment of GrabCut is provided below with reference to FIG. 3. It will be appreciated that alternative segmentation methods may alternatively be used and GrabCut provides just one example of a suitable method. FIG. 3 is a flow diagram of an example method of image segmentation. This method uses graph cuts applied to a user defined bimap or trimap to segment an image into foreground and background regions. The image, which is considered to comprise pixels $z_n$ in color space, is segmented into a bimap or trimap based on user input (block 302). The user defines at least a background region ($T_B$) and may also specify an unknown region ($T_U$) and/or a foreground region ($T_F$). Where the user defines only the background region, the foreground region is set to be the empty set ($T_F=\emptyset$) and the unknown region is set to the complement of the background region ($T_U=\overline{T_B}$). A parameter $\alpha_n$, which may be referred to as an opacity value, for each pixel is used to express the segmentation of the image and initially the opacity values are initialized as follows:

$\alpha_n=0$ for $n \in T_B$ $\alpha_n=1$ for $n \in T_U$

Gaussian mixture models (GMMs) may be used in defining the foreground and background properties (in block 304) and the foreground and background GMMs are initialized from sets $\alpha_n=0$ and $\alpha_n=1$ respectively. Each GMM (one for the background and one for the foreground) is taken to be a full-covariance Gaussian mixture with K components (e.g. K=5). A vector $k=(k_1, \ldots, k_n)$ is used, with $k_n \in \{1, \ldots, K\}$ to assign a unique GMM component (one component either from the background or the foreground model) to each pixel according to the opacity value $\alpha_n$. For each pixel in the unknown region (i.e. for each n in $T_U$) GMM components are assigned using:

$$k_n := \underset{k_n}{\operatorname{argmin}} D_n(\alpha_n, k_n, \underline{\theta}, z_n) \tag{1}$$

And then the GMM parameters are learnt from the data z using:

$$\underline{\theta} := \underset{\underline{\theta}}{\operatorname{argmin}} U(\underline{\alpha}, k, \underline{\theta}, z) \tag{2}$$

The Gibbs energy for segmentation may be defined (in block 306) as:

$$E(\underline{\alpha}, k, \underline{\theta}, z) = U(\underline{\alpha}, k, \underline{\theta}, z) + V(\underline{\alpha}, z) \tag{3}$$

Where the parameter $\theta$ describes the image foreground and background distributions (as learned in block 304 using equation (2)), V is a smoothness term computed by Euclidean distance in color space, U evaluates the fit of opacity distribution $\alpha$ to the data z, given the parameter $\theta$ and taking account of the color GMM models, where:

$$U(\underline{\alpha}, k, \underline{\theta}, z) := \Sigma D_n(\alpha_n, k_n, \underline{\theta}, z_n) \tag{4}$$

Where:

$D_n(\alpha_n, k_n, \underline{\theta}, z_n) = -\log p(z_n | \alpha_n, k_n, \underline{\theta}) - \log \pi(\alpha_n, k_n)$ p( ) is a Gaussian probability distribution and π( ) are mixture weighting coefficients, so that (up to a constant):

$$D_n(\alpha_n, k_n, \underline{\theta}, z_n) = -\log \pi(\alpha_n, k_n) + \frac{1}{2} \log \det \sum (\alpha_n, k_n) + \frac{1}{2}[z_n - \mu(\alpha_n, k_n)]^T \sum (\alpha_n, k_n)^{-1}[z_n - \mu(\alpha_n, k_n)] \tag{5}$$

Therefore the parameters of the model are:

$$\underline{\theta} = \{\pi(\alpha, k), \mu(\alpha, k), \Sigma(\alpha, k), \alpha=0, 1, k=1 \ldots K\} \tag{6}$$

The smoothness term V is computed as follows, (where the contrast term is computed using Euclidean distance in the color space):

$$V(\underline{\alpha}, z) = \gamma \sum_{(m,n) \in C} [\alpha_n \neq \alpha_m] \exp -\beta \|z_m - z_n\|^2 \tag{7}$$

Where C is the set of pairs of neighboring pixels. When the constant $\beta=0$, the smoothness term is simply the well-known Ising prior, encouraging smoothness everywhere, to a degree determined by the constant $\gamma$. In an implementation, $\beta$ may be greater than zero to relax the tendency to smoothness in regions of high contrast. The constant $\beta$ may be chosen as:

$$\frac{1}{\beta} = 2\langle (z_m - z_n)^2 \rangle$$

Where < > denotes expectation over an image sample. In an implementation, such a choice of $\beta$ ensures that the exponential term in V (equation (7)) switches appropriately between high and low contrast.

Given the energy model described above, the foreground and background portions can be computed (in block 308) by using a standard minimum cut algorithm to solve:

$$\min_{\{\alpha_n : n \in T_U\}} \min_k E(\underline{\alpha}, k, \underline{\theta}, z) \tag{8}$$

All pixels in the trimap region $T_B$ are assigned to background and all pixels in $T_F$ to foreground. Pixels in $T_U$ are assigned to either foreground or background, depending on the result of the energy minimization (equation (8)).

The process may be repeated, as indicated by the dotted arrow 30, in an iterative minimization process (or other iterative optimization process) until convergence. Further processing may then be used, such as border matting.

In another example of further processing, an additional image segmentation process may be performed. In such an embodiment, a band or ribbon of image elements is identified from the final segmentation solution 26 (e.g. following block 210 in FIG. 2). This band or ribbon comprises image elements within a defined distance of a foreground/background transition. Image segmentation at the original resolution of the input image may then be performed on those image elements within the band or ribbon and the results used to update the final segmentation solution 26.

Figure 4:
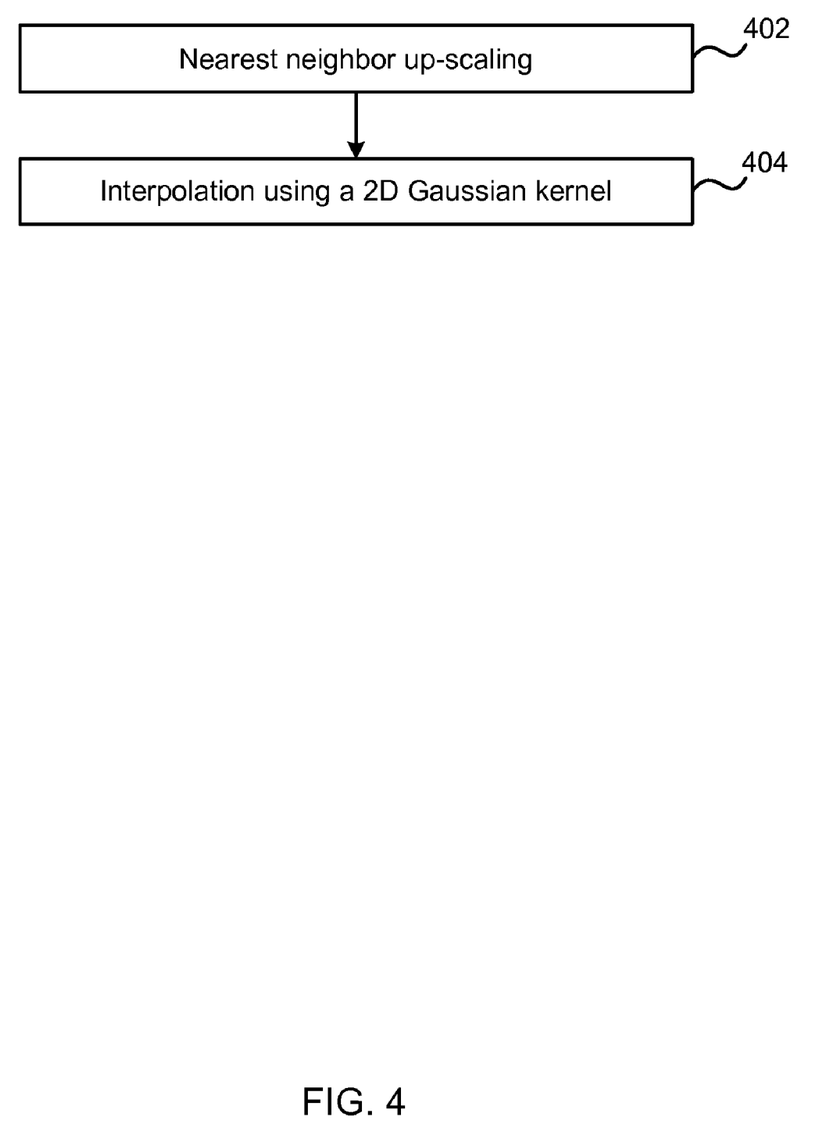
FIG. 4 shows a flow diagram of an example method of up-scaling.

Having segmented the image (in block 206) and generated an initial binary solution 22, this initial binary solution is up-scaled (or up-sampled) and smoothed to generate an interim solution 24 (in block 208, e.g. as performed by the up-scaling and smoothing engine 107 in FIG. 1) which has a higher resolution than the initial binary solution 22 and which is a smooth, non-binary interpolated solution (as described above). FIG. 4 shows a flow diagram of an example method of up-scaling and smoothing which may be used. In this method, the initial binary solution 22 is first up-scaled using nearest-neighbor up-scaling (block 402) which generates a binary intermediate solution of higher resolution than the initial binary solution. This intermediate solution is then smoothed using a 2D Gaussian function as an interpolating kernel (block 404) in order to create the interim solution 24. If the binary intermediate solution was used instead of the final binary segmentation solution as the output from the method (i.e. without performing the smoothing operation), the segmentation would be of poor quality because of up-scaling artifacts.

Figure 5:
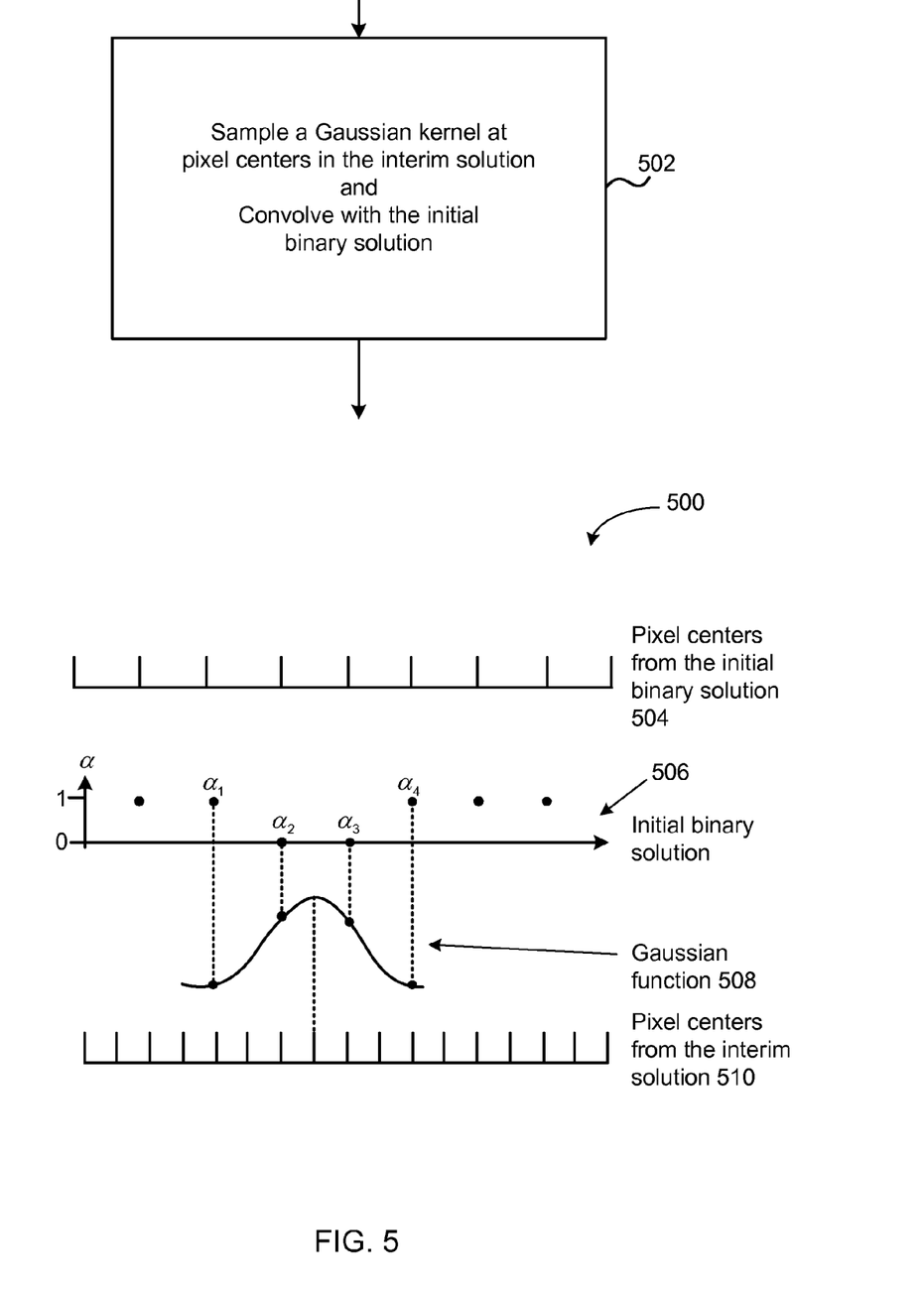
FIG. 5 shows a flow diagram of another example method of up-scaling and a graphical representation of this method.

In another embodiment, however, the convolution and up-scaling may be performed in a single step (block 502), as shown in FIG. 5. In this embodiment, a Gaussian kernel is sampled at the image element centers in the interim solution (i.e. the output image element centers for this step which are more closely spaced than the image element centers in the initial binary solution) and convolved with the initial binary solution 22 to generate the interim solution 24. As described above, the interim solution 24 is a non-binary solution of higher resolution than the initial binary solution 22 and may be referred to as a monochrome or gray-scale solution. A one-dimensional (1D) representation 500 of this operation, also in FIG. 5, which uses pixels as the image element, shows the pixel centers 504 from the initial binary solution 22, a graphical representation 506 of the initial binary solution 22, a Gaussian function 508 and the pixel centers 510 from the resultant interim solution 24. In this 1D example, the opacity value (which may alternatively be referred to as a gray-scale value or non-binary segmentation parameter) of the pixel marked by arrow 512 comprises a weighted sum of the four opacity values $\alpha_1$-$\alpha_4$. The weights are given by the Gaussian interpolation function, as indicated by the dotted lines in FIG. 5. By performing the convolution and up-scaling in a single step, as shown in FIG. 5, the amount of computation that is required to perform the interpolation is reduced (e.g. $M^2$ compared to $(Mu)^2$, where u is the up-scaling factor and the Gaussian interpolation function comprises a M×M kernel). The method shown in FIG. 5 provides an efficient method of smoothly up-scaling binary images for use in image segmentation.

Figure 6:
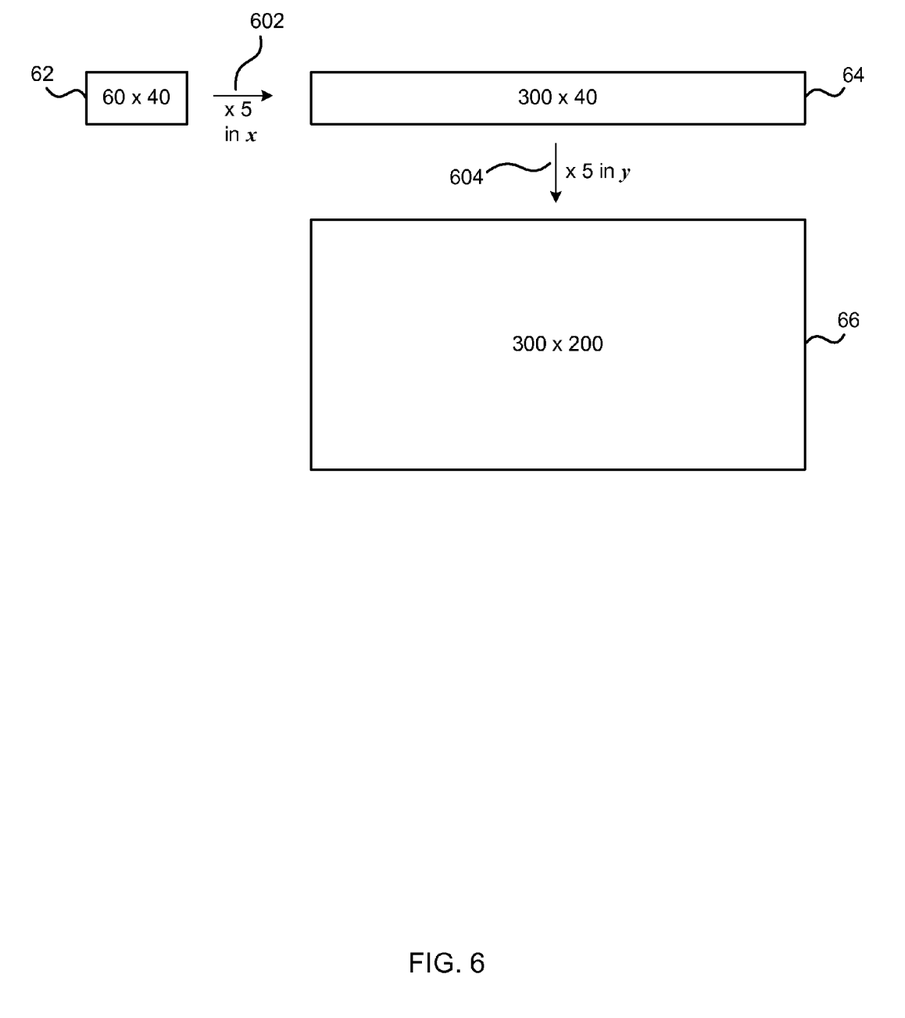
FIG. 6 shows a graphical representation of an optimization of the up-scaling process.

In order to further reduce the computational requirements for interpolation, the interpolation may be performed in two passes (e.g. by processing rows and columns of the image in two separate passes) and a 1D Gaussian kernel may be used (e.g. a 1×N kernel followed by a N×1 kernel rather than using a N×N kernel, which reduces the amount of computation for each pixel from $N^2$ multiply-add operations to 2N, where N is an integer). FIG. 6 shows a graphical representation of this optimization of the up-scaling and smoothing process (of block 208). In a first step (arrow 602), sampling and convolution occurs in the x-dimension (or horizontal dimension i.e. processing rows) to generate an intermediate solution 64 (e.g. 300×40 pixels in size, for an up-scaling factor of 5) from the initial binary solution 62 (e.g. 60×40 pixels). The sampling and convolution in the y-dimension (or vertical dimension, arrow 604, i.e. processing columns) is then applied to the intermediate solution 64 to create the interim solution 66 (e.g. 300×200 pixels). This optimization provides larger savings where a bigger kernel is used but may be used for any size of kernel and may be used with either of the methods described above (e.g. the two passes may be implemented within the single step of block 502 shown in FIG. 5).

In an example, the standard deviation of the Gaussian kernel used in the methods described above is, in terms of image elements (e.g. pixels), approximately 0.74 times the up-scaling factor (in the interim solution image space, or 0.74 pixels in the initial binary solution image space). Although the above description refers to the use of a Gaussian function as an interpolating or smoothing kernel, it will be appreciated that other functions may alternatively be used for the interpolation, such as a Lanczos filter, tent filter or cubic polynomial. Additionally it will be appreciated that the two pass process shown in FIG. 6 and described above may be used with any separable kernel and not just with a Gaussian kernel.

Having generated an interim solution 24 (in block 208), a threshold is applied (in block 210, e.g. as performed by the thresholding engine 108 in FIG. 1) to create the final binary segmentation solution 26. This threshold (which may be a user specified threshold 103, as shown in FIG. 1) may be set at the mid-point, e.g. the threshold, which is applied to the opacity values $\alpha$, is, for example, set at 0.5, or alternatively another value may be used (e.g. a value higher than 0.5 may be used in an embodiment which favors background image elements above foreground image elements).

Once the final binary segmentation solution 26 has been generated (in block 210), the solution may be displayed to a user via a display device. In some embodiments, the solution 26 may be processed further before being presented to the user (as described above). Once the solution has been displayed to the user, the user may refine the segmentation through user editing. This user editing may result in a further image segmentation process being performed and this may use one of the methods described herein.

Figure 7:
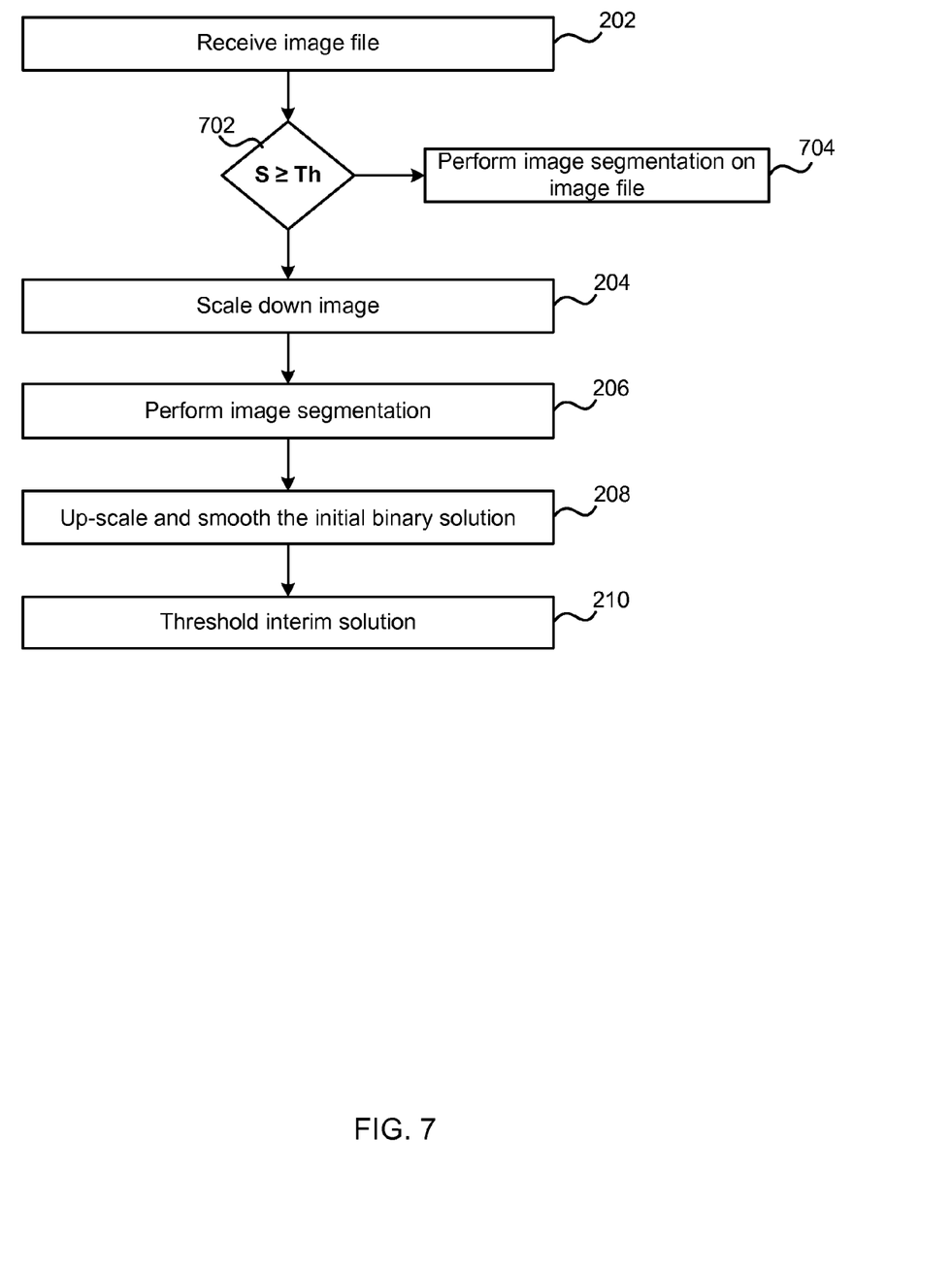
FIG. 7 is a flow diagram of another example method of performing image segmentation.

FIG. 7 is a flow diagram of another example method of performing image segmentation which is a variation of that shown in FIG. 2 and described above. In this method, a decision is made (in block 702, e.g. as performed by the selection engine 109 in FIG. 1) which determines whether the image segmentation is performed on the original input image (in block 704) or on a modified image which comprises a reduced resolution version of the image (in block 206). The decision may be made (in block 702) by comparing a size parameter of the image, S, with a threshold, Th. In an embodiment, the size parameter is the number of image elements in the original input image and the threshold may, for example, be set at 1.3 or 1.5 MPixels. If the image file (received in block 202) has a size parameter which is equal in size or larger than the threshold size (i.e. the size parameter is not smaller than the threshold size), it is down-scaled to a smaller predefined size, e.g. 0.8 or 1.0 MPixels (in block 204). In another embodiment, the size parameter is the longest dimension of the image in terms of image elements and the threshold may, for example, be set at 1280 pixels. If the longest dimension of the image (received in block 202) is 1280 pixels or more, the image is down-scaled to a smaller predefined size, e.g. such that its longest dimension is 1024 pixels (in block 204).

Where the original image (received in block 202) is segmented without down-scaling (in block 704), any suitable image segmentation method may be used. In an example, the GrabCut method, as described above with reference to FIG. 3, may be used.

The values of the thresholds given above are provided by way of example only and other values may alternatively be used. In an embodiment, the threshold and the predefined size may be the same, such that all images which are larger than (or not smaller than) the predefined size (however this is specified) are downscaled to the predefined size. In another embodiment, a predefined size may not be used and instead a down-scaling factor may be defined. In this embodiment, if the size parameter of the image exceeds the threshold ('Yes' in block 702), the image is down-scaled (in block 204) by the predefined down-scaling factor before being segmented (in block 206). The values of the threshold, smaller predefined size and/or down-scaling factor may be set to maximize the efficiency of the method, dependent upon the processing power available, the speed required and the required quality of the segmentation.

Figure 8:
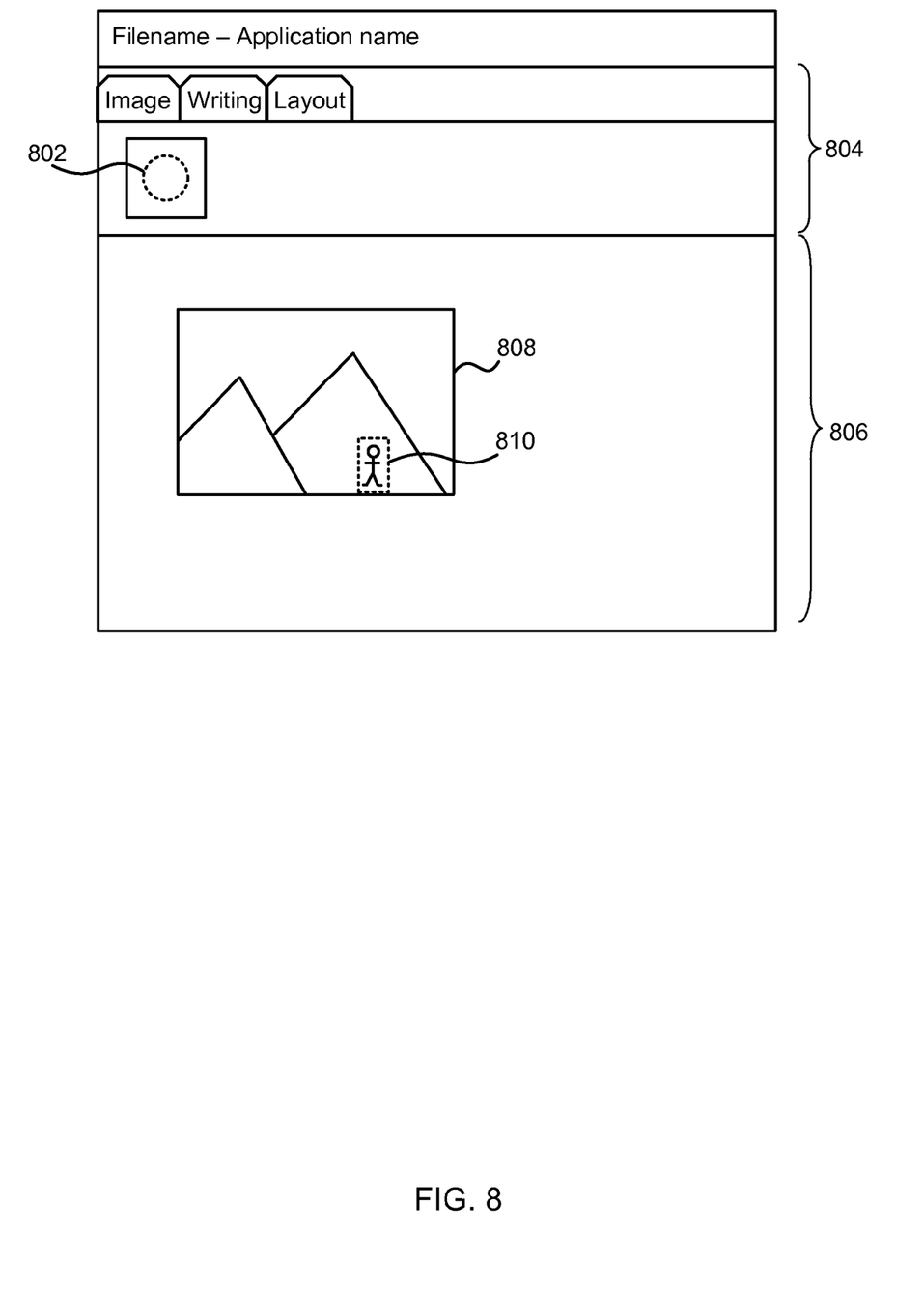
FIG. 8 is a schematic diagram of a user interface for performing image segmentation.

The methods described above may be implemented in an image editing tool within a software application. In an embodiment, the software application is an image editing application. In another embodiment, the software application is not a dedicated image editing application, but may instead be a word processing application, a spreadsheet application, a slide presentation application, a database application, an email application etc. Where a number of software applications are combined within a multiple functionality application, the image editing tool may be available within each application and may be presented to the user in the same or a similar manner in each application within the multiple functionality application. In an example, a dedicated control 802 for image segmentation may be provided within a ribbon-shaped user interface 804 above the software application workspace 806, as shown in the schematic diagram of FIG. 8.

When a user clicks (e.g. with a mouse or other pointing device, which may include a finger if the display device is touch sensitive) on the dedicated control 802, having selected an image 808 which is displayed in the software application workspace 806, one of the methods (e.g. the method shown in FIG. 2 or FIG. 7) described herein is performed, for example, the step of down-scaling the image to generate a modified version of the image may be performed in response to receiving a user input, such as a user click. The image 808 may, for example, have been pasted into a word processing document, a spreadsheet, an email, a database or a slide presentation. User interaction may be used (e.g. user brush strokes 102, as shown in FIG. 1) to define the bimap or trimap which is used in segmentation of the image (e.g. in block 302 of FIG. 3) and this user input may be provided before or after clicking on the dedicated control 802. In an example, the user marks a rectangle on the image (e.g. as indicated by dotted rectangle 810) and this has the effect that the initial background region (e.g. $T_B$ using the notation of the GrabCut example provided above) is set to the area outside the marked rectangle. In another example, the background region may be set to comprise a strip of image elements (e.g. pixels) around the outside of the marked rectangle. Other forms of user input may be used and the user input received may be interpreted in different ways in setting the initial background/foreground regions.

Figure 9:
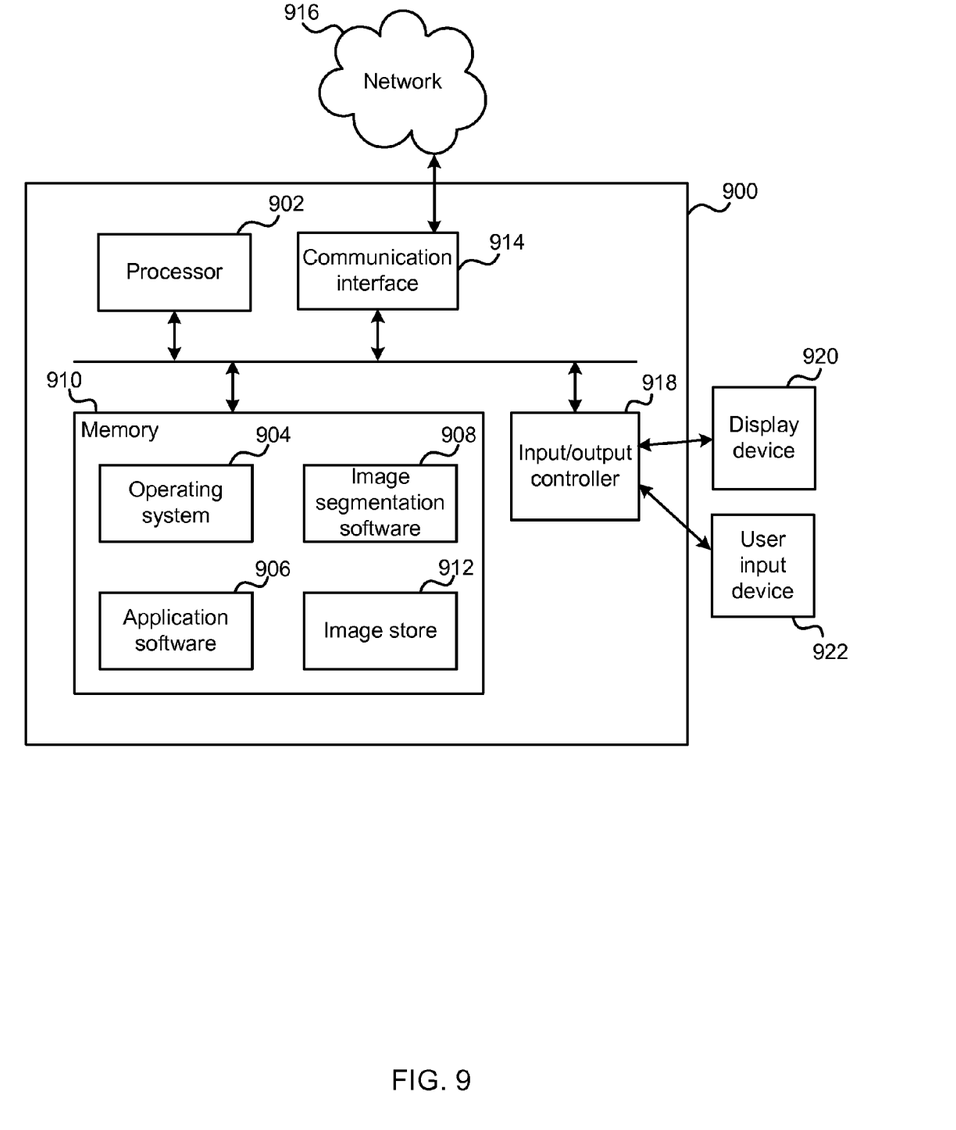
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described herein may be implemented.

Computing-based device 900 comprises one or more processors 902 which may be microprocessors, controllers or any other suitable type of processors for processing computing executable instructions to control the operation of the device in order to perform image segmentation, as described herein. Platform software comprising an operating system 904 or any other suitable platform software may be provided at the computing-based device to enable application software 906 to be executed on the device. The application software 906 may include software (i.e. executable instructions) for performing image segmentation or separate software 908 may be provided. Where separate software is provided, this may be called by the application software 906 or may be called directly by the user (e.g. as an image segmentation application).

The computer executable instructions may be provided using any computer-readable media, such as memory 910. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 900 it will be appreciated that the storage may be distributed or located remotely and accessed via a network or other communication link (e.g. using communication interface 914).

The memory 910 may comprise an image store 912 for storing the images which are segmented using the methods described herein. In an embodiment, the image file may be received (in block 202) having been accessed from the image store 912. In another embodiment, the image file may be received from another location, e.g. via a communication interface 914, and stored in the image store 912. The communication interface 914 is arranged to send/receive information over a network 916. Any suitable network technology (including wired and wireless technologies) and network protocol(s) may be used.

The computing-based device 900 also comprises an input/output controller 918 arranged to output display information to a display device 920 which may be separate from or integral to the computing-based device 900. The display information may provide a graphical user interface and may be arranged to display the results of the image segmentation method described herein to the user. The input/output controller 918 is also arranged to receive and process input from one or more devices, such as a user input device 922 (e.g. a mouse or a keyboard). This user input may be used to initiate image segmentation (e.g. by clicking control 802), to select the image to be segmented, to define a bimap/trimap (as used in block 302 of FIG. 3) etc. In an embodiment the display device 920 may also act as the user input device 922 if it is a touch sensitive display device. The input/output controller 918 may also output data to devices other than the display device, e.g. a locally connected printing device (not shown in FIG. 9).

Although the present examples are described and illustrated herein as being implemented in the system shown in FIG. 9, the system described is provided as an example and not a limitation. As those skilled in the art will appreciate, the present examples are suitable for application in a variety of different types of computing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
receiving, by a computer, an image;
generating a modified image from the image, the modified image having a lower image resolution than the image;
segmenting at least a part of the modified image into a background portion and a foreground portion to create an initial binary solution, the initial binary solution comprising data labeling a plurality of image elements in the modified image as either background or foreground;
up-scaling and smoothing the initial binary solution to create an interim solution having a higher resolution than the initial binary solution and comprising a non-binary segmentation parameter associated with each of a plurality of image elements in the interim solution; and
based on a threshold, creating a final binary segmentation solution from the interim solution, the final binary segmentation solution having substantially the same resolution as the interim solution and comprising data labeling a plurality of image elements in the received image as either background or foreground.

2. A method according to claim 1, wherein the up-scaling and smoothing is performed without using the received image.

3. A method according to claim 1, wherein up-scaling and smoothing the initial binary solution to create an interim solution comprises:
interpolating the initial binary solution by convolution with a smoothing kernel to compute a non-binary segmentation parameter for each of a plurality of image elements in the interim solution.

4. A method according to claim 3, wherein the smoothing kernel comprises a Gaussian kernel.

5. A method according to claim 4, wherein the Gaussian kernel comprises a one-dimensional Gaussian kernel and wherein interpolating the initial binary solution by convolution with a smoothing kernel comprises processing rows and columns of the initial binary solution in two separate passes.

6. A method according to claim 5, wherein a standard deviation of the one-dimensional Gaussian kernel is substantially equal to 0.74 times the size of an image element in the initial binary solution.

7. A method according to claim 1, wherein segmenting at least a part of the modified image into a background portion and a foreground portion to create an initial binary solution comprises:
segmenting the modified image into a foreground portion and a background portion;
determining properties corresponding to the foreground and background portions;
updating the background and foreground properties based on the portions; and
updating the foreground and background portions based on the updated background and foreground properties.

8. A method according to claim 1, further comprising:
displaying, on a display device, at least one of a background and a foreground portion of the image, the background and foreground portions being determined using the final binary segmentation solution.

9. A method according to claim 1, implemented in an image editing tool in a software application.

10. A method according to claim 9, wherein the software application comprises one of a word processing application, a spreadsheet application, a slide presentation application, a database application and an email application.

11. A method according to claim 1, wherein the step of generating a modified image from the image is performed in response to receiving at least one user input.

12. One or more tangible device-readable media with device-executable instructions that, when executed by a computing system, direct the computing system to perform steps comprising:
accessing an image; and
if a size parameter associated with the image is not less than a predefined threshold:
down-scaling the image to create a modified image from the image, the modified image having a lower image resolution than the image;
segmenting the modified image to create an initial binary solution comprising a binary parameter associated with each of a plurality of image elements in the modified image, the binary parameter assigning an image element to a background or a foreground portion;

up-scaling and smoothing the initial binary solution to form an interim solution, the interim solution having a higher resolution than the initial binary solution and comprising a non-binary parameter associated with each of a plurality of image elements in the interim solution; and generating a final binary segmentation solution based on a threshold value of the non-binary parameter, the final binary segmentation solution having a higher resolution than the initial binary solution and comprising data assigning a plurality of image elements in the accessed image to either a background or a foreground portion.

13. One or more tangible device-readable media according to claim 12, wherein the up-scaling and smoothing is performed without using the accessed image.

14. One or more tangible device-readable media according to claim 12, further comprising device-executable instructions that, when executed by a computing system, direct the computing system to perform a step comprising:

displaying at least one background or foreground portion of the image.

15. One or more tangible device-readable media according to claim 12, wherein the size parameter comprises one of a number of image elements in the image and a longest image dimension.

16. One or more tangible device-readable media according to claim 12, wherein up-scaling and smoothing the initial binary solution to form an interim solution comprises:

sampling a smoothing kernel at an image element center in the interim solution;

convolving the smoothing kernel with the initial binary solution to compute a non-binary parameter for the image element; and repeating the sampling and convolving steps for each of the plurality of image elements in the interim solution.

17. One or more tangible device-readable media according to claim 16, wherein the sampling and convolving is performed in two passes, one pass using a 1×N Gaussian kernel and one pass using a N×1 Gaussian kernel, where N is an integer.

18. A computer-implemented method of segmenting an image into a foreground portion and a background portion comprising:

accessing the image;

down-scaling the image to create a modified version of the image having a lower image resolution than the image;

segmenting the modified version of the image to generate an initial binary segmentation, the initial binary segmentation comprising data labeling a plurality of image elements in the modified version of the image as part of a background portion or a foreground portion;

generating an interim solution having a higher resolution than the initial binary segmentation by, for each of a plurality of image elements in the interim solution, computing a non-binary value by convolving an interpolation kernel centered on the image element with the initial binary segmentation;

based on a threshold, generating a final binary segmentation solution having substantially the same resolution as the interim solution and comprising data labeling a plurality of image elements in said image as part of a background portion or a foreground portion; and displaying at least one background or foreground portion of said image.

19. A computer-implemented method according to claim 18, wherein segmenting the modified of the image comprises:

segmenting the modified version of the image into a foreground portion and a background portion;

determining properties corresponding to the foreground and background portions;

updating the background and foreground properties based on the portions; and updating the foreground and background portions based on the updated background and foreground properties.

20. A computer-implemented method according to claim 18, wherein computing a non-binary value by convolving an interpolation kernel centered on the image element with the initial binary segmentation uses a one-dimension Gaussian kernel and is performed in two passes, one operating on rows of image elements and one operating on columns of image elements.

* * * * *